(12) United States Patent
Hiroki (10) Patent No.: US 7,844,984 B2
(45) Date of Patent: Nov. 30, 2010

(54) OPTICAL RECORDING MEDIUM AND MANUFACTURING METHOD THEREOF

(75) Inventor: Tomoyuki Hiroki, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/637,389

(22) Filed: Dec. 14, 2009

(65) Prior Publication Data

US 2010/0089523 A1 Apr. 15, 2010

Related U.S. Application Data (62) Division of application No. 11/552,737, filed on Oct. 25, 2006, now abandoned.

(30) Foreign Application Priority Data

Nov. 10, 2005 (JP) .............................. 2005-326235

(51) Int. Cl.
*G11B 7/24* (2006.01)
*G11B 7/252* (2006.01)
*B29D 17/00* (2006.01)

(52) U.S. Cl. ..................... 720/718; 264/220; 156/273.5

(58) Field of Classification Search ................ 720/718; 430/320, 321, 270.11; 264/1.33, 220, 227; 425/406, 494; 369/275.1; 156/249, 273.3, 156/273.5, 275.5, 275.7, 74, 319
See application file for complete search history.

(56) References Cited

U.S. PATENT DOCUMENTS

| | | | |
|---|---|---|---|
| 6,030,677 A | 2/2000 | Ro et al. ..................... 428/64.1 |
| 6,117,284 A | 9/2000 | Mueller .................. 204/192.27 |
| 6,500,511 B1 * | 12/2002 | Ooki et al. .................. 428/64.1 |
| 6,743,320 B2 | 6/2004 | Hisada et al. ................ 156/233 |
| 6,797,090 B2 * | 9/2004 | Yang et al. ..................... 156/74 |
| 7,704,425 B2 * | 4/2010 | Heidari et al. ............... 264/220 |
| 2003/0039794 A1 | 2/2003 | Ootera ....................... 428/64.4 |
| 2004/0004300 A1 * | 1/2004 | Yamaguchi et al. ......... 264/1.33 |
| 2005/0005284 A1 | 1/2005 | Vromans ..................... 720/718 |
| 2006/0245341 A1 | 11/2006 | Weinzert ................. 369/275.1 |
| 2008/0037402 A1 | 2/2008 | Sugiura .................... 369/275.1 |

FOREIGN PATENT DOCUMENTS

JP 2002-260307 9/2002
WO WO 03019541 A1 * 3/2003

* cited by examiner

*Primary Examiner*—William J Klimowicz
(74) *Attorney, Agent, or Firm*—Fitzpatrick, Cella, Harper & Scinto (57) ABSTRACT

A method of manufacturing a multilayered recording medium. A transmissive stamper with a depression protrusion contour contacts a protection layer on a supporting base. The transmissive stamper is then irradiated with ultraviolet rays to cure the protection layer and the transmissive stamper is subsequently removed. A recording layer is deposited on the cured protection layer. Further, another recording layer is deposited on the transmissive stamper. Next, an intermediate layer is formed on the recording layer deposited on the transmissive stamper and thereafter, the intermediate layer is attached to the recording layer on the cured protection layer. Then, the transmissive stamper is irradiated with ultraviolet rays to cure the intermediate layer. Thereafter, the supporting base is removed from the protection layer. These steps produce a multilayered optical recording medium.

10 Claims, 5 Drawing Sheets

OPTICAL RECORDING MEDIUM AND MANUFACTURING METHOD THEREOF

This application is a divisional application of U.S. patent application Ser. No. 11/552,737, filed on Oct. 25, 2006, now abandoned.

This application claims the benefit of Japanese Patent Application No. 2005-326235, filed Nov. 10, 2005, which is hereby incorporated by reference herein in its entirety.

BACKGROUND OF THE INVENTION

1. Field of the Invention

The present invention relates to an optical recording medium for recording and reproducing information, by use of laser beams, and a manufacturing method thereof, and, more particularly, to an optical recording medium having a plurality of information recording layers (hereafter, referred to as "recording layers"), and a manufacturing method thereof.

2. Description of the Related Art

In recent years, data handled by an information processing apparatus, such as a computer or a video apparatus, has diversified into various types of information, such as sound, image, and moving image, whereby various types of recording modes and information recording media have been utilized. The required data sizes of the information recording media have been increasing, and the demand for high density has been raised.

Optical disks record and reproduce information with a laser beam focused at a small region on an information recording surface. Any type of optical disk is of excellent high density, detachable (removable), and low-bit-cost, and is utilized in diverse applications, such as data distribution and information backup. Optical disks are roughly classified into a reproduction-only type, a write-once type, and a rewritable type, based on the structure of a recording layer.

Basically, the recording capacity of an optical disk is proportional to the recording density and the area of the information recording surface. The recording density is in inverse proportion to the size of a focused laser spot. A laser-spot diameter is determined by $\gamma/NA$ ($\gamma$ and NA denote a laser wavelength and a numerical aperture, respectively). Therefore, it is conceivable that, in order to increase the recording capacity, the information area is increased by utilizing a short-wavelength laser beam and by enlarging the numerical aperture of the lens. However, shortening a laser beam wavelength is restricted by the elements and enlarging the diameter of a disk, so that an increase in the information area makes the handling of the disk difficult. Thus, enlarging a numerical aperture and providing a multilayered recording layer so as to increase the information area are main research themes.

With an increase in the numerical aperture of a lens, it is required to shorten the distance between the lens and the information recording surface. Therefore, the structure of an optical disk has been changed.

In the case of a CD (compact disk), an information recording surface is provided on a substrate of 1.2 mm in thickness, and a laser beam is radiated from the substrate side through the substrate, to achieve recording and reproduction.

In a DVD (digital versatile disk), recording and reproducing have been accomplished using the substrate in a similar way. However, the thickness of the substrate, on which the information recording surface is provided, has been reduced to 0.6 mm, to bring the lens close to the information recording surface. In order to reinforce the disk, a dummy substrate of 0.6 mm in thickness is attached to the surface opposite to the laser incident face of the information recording surface.

In the case of a BD (Blue-ray Disc), in which high density has been further achieved, for example, as disclosed in Japanese Patent Application Publication No. 2002-260307, a plurality of recording layers are laminated on a 1.1. mm-thick resin substrate, which is a base for an optical disk, and a protection layer of approximately 0.1 mm in thickness is provided on the recording layer. A laser beam is radiated from the protection-layer side so as to shorten the distance between the optical system and the information recording surface, thereby enlarging the lens numerical aperture. A structure is employed in which the recording layers are separated from one another, by respective intermediate layers, and the laser beam focused on a specific recording layer does not affect other recording layers.

A type of DVDE, which uses two-layered information recording films, has been put to practical use. Two methods of manufacturing the DVDs have been known. In one of the methods, which is known as "combining", two 0.6 mm-thick substrates having a recording layer thereon are bonded together with an intermediate layer in-between. In the other method, a first recording layer, an intermediate layer, and a second recording layer are formed on a substrate of 0.6 mm in thickness, and a dummy substrate is finally bonded to the second recording layer. The combining is effective as a manufacturing method of a two-layer type DVD. However, the combining is not easily applied to a BD, because the protection layer in the BD is thin and difficult to handle. In bonding a dummy substrate to the second recording layer, a transmissive stamper, used to form track grooves on the intermediate layer, can be diverted to the dummy substrate. This has not been a cost factor. However, this method cannot be applied to a BD that does not have a dummy substrate.

A conventional technique will be further explained, by exemplifying a typical manufacturing method for a rewritable type BD having two recording layers.

FIGS. 6A, 6B, 6C, 6D, 6E and 6F are views schematically illustrating an example of a BD manufacturing method according to a conventional technique.

Figure 6A:
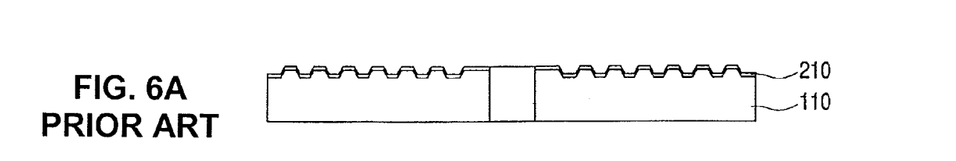
FIGS. 6A, 6B, 6C, 6D, 6E and 6F illustrate an example of a production process of a conventional optical recording medium manufacturing method.

In the first place, a first recording layer 210 is formed on the main surface of a substrate 110 molded by use of a typical resin molding machine, on which information-tracking guide grooves (hereafter, referred to as "tracking grooves") are formed (in FIG. 6A). In the case when the first recording layer 210 is a phase-change type, a typical sputtering apparatus can be utilized.

Figure 6B:
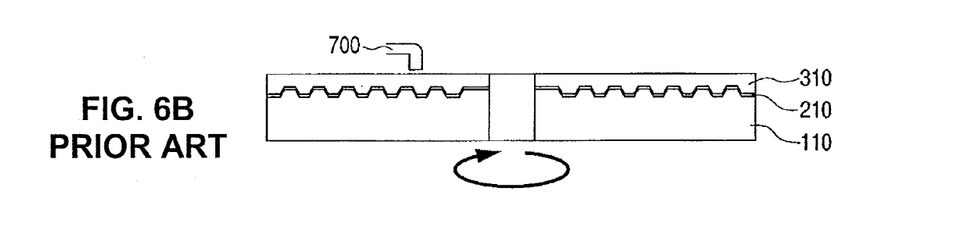

Next, an ultraviolet curing resin, which becomes an intermediate layer, is dispensed through a nozzle 700 on the first recording layer 210, which is rotating, and an intermediate layer 310 is spin-coated up to approximately 5 to 40 µm in thickness (in FIG. 6B).

Figure 6C:
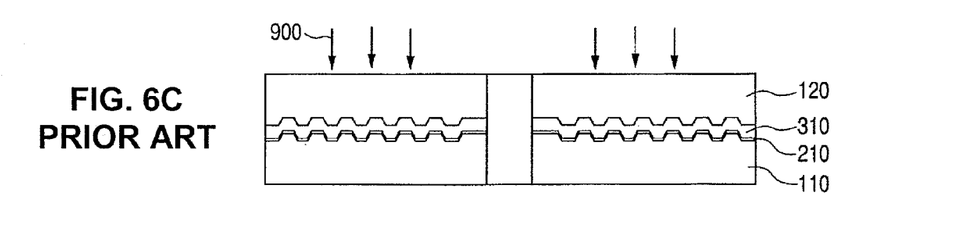
Figure 6D:
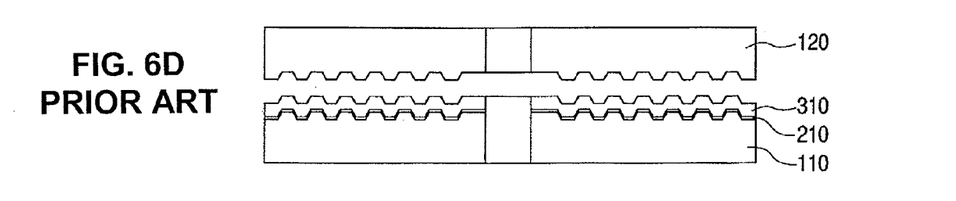

A transmissive stamper 120 is closely contacted to the formed intermediate layer 310, and then, ultraviolet rays 900 are radiated onto the intermediate layer 310, so as to cure the intermediate layer 310 (in FIG. 6C). After the intermediate layer 310 is cured, the transmissive stamper is removed, so that tracking grooves for a second recording layer are formed on the top surface of the intermediate layer 310 (in FIG. 6D). The transmissive stamper 120 is discarded.

Figure 6E:
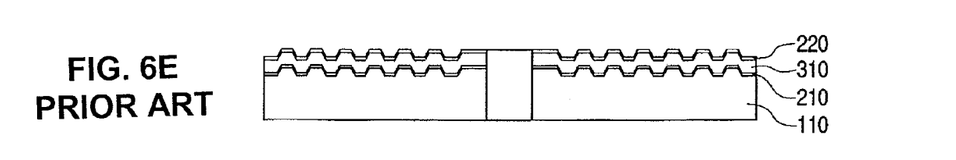

A second recording layer 220 is formed on the top surface of the intermediate layer 310, in which the tracking grooves have been formed (in FIG. 6E).

Figure 6F:
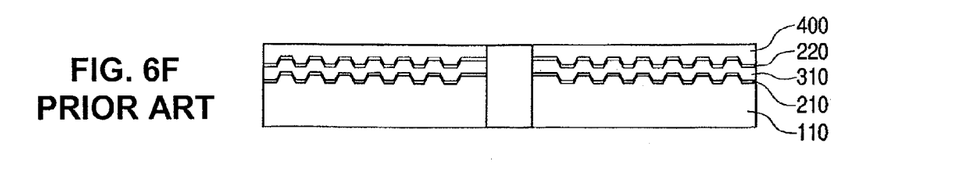

A protection layer 400, of 50 to 200 µm in thickness, is formed on the top face of the second recording layer 220, so that a BD is completed (in FIG. 6F). The protection layer 400 may be formed either by means of spin coating or by adhering a sheet-like member.

It is conceivable that, in order to make the transmissive stamper 120 durable to radiated ultraviolet rays, the stamper 120 is made of glass. However, it is difficult to remove the glass made stamper after the intermediate layer has cured. Thus, a resin material, which has a superior ability to separate, is generally utilized as a material for the transmissive stamper 120. However, radiation of ultraviolet rays makes a resin material change, and reduces the transmittance of the resin material. For that reason, a resin-made transmissive stamper is not recurrently utilized, and is discarded (in FIG. 6D), thereby increasing the production costs for a disk.

SUMMARY OF THE INVENTION

The present invention has been made in consideration of the foregoing situation of the conventional techniques, and a transmissive stamper being used is recycled, so that production costs and waste disposal are reduced.

According to one aspect, the present invention provides a manufacturing method for an optical recording medium, comprising the steps of depositing a recording layer on a substrate, forming an intermediate layer on the recording layer, transferring a depression-protrusion contour to the intermediate layer, by use of a transmissive stamper, removing the transmissive stamper away from the intermediate layer, and recycling the transmissive stamper as the substrate of another typical recording medium.

The substrate formed through recycling the transmissive stamper is preferably comprised of a plurality of the transmissive stampers that are attached on top of each other.

The transmissive stamper is preferably comprised of any one of a polycarbonate resin, a polyolefin resin, and an acrylate resin.

The transmissive stamper preferably has respective depression-protrusion contours on both sides thereof.

According to another aspect, the present invention provides an optical recording medium comprising a substrate formed of the recycled transmissive stamper, a recording layer laid above the substrate, and a protection layer laid above the recording layer.

The substrate preferably has respective depression-protrusion contours on both sides thereof, in which one side of the substrate is comprised of a side utilized for transferring a depression-protrusion contour to the intermediate layer.

According to still another aspect, the present invention provides a manufacturing method for an optical recording medium, comprising the steps of transferring a depression-protrusion contour of a transmissive stamper to a protection layer laid on a supporting base, depositing a first recording layer on the protection layer, after removing the transmissive stamper away from the protection layer, depositing a second recording layer on a side opposite to the transferred side of the transmissive stamper, forming an intermediate layer on the second recording layer and attaching the first recording layer to the intermediate layer, and removing the supporting base away from the protection layer, after radiating ultraviolet rays on the intermediate layer. The ultraviolet rays is are preferably incident from the transmissive-stamper side.

Further features of the present invention will become apparent from the following description of exemplary embodiments, with reference to the attached drawings.

DESCRIPTION OF THE EMBODIMENTS

Preferred embodiments of the present invention will be explained below, with reference to the accompanying drawings.

First Embodiment

Figure 1A:
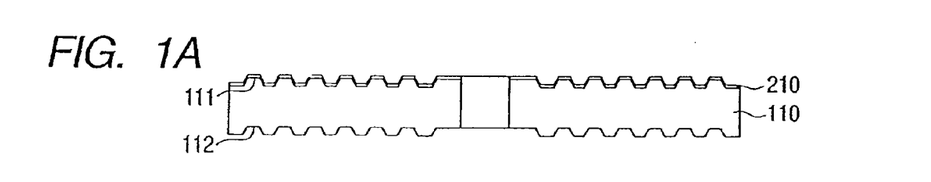
FIGS. 1A, 1B, 1C, 1D, 1E and 1F illustrate a production process of a first embodiment of an optical recording medium manufacturing method, according to the present invention.

An arbitrary material may be utilized for a transmissive stamping-capable substrate that also serves as a transmissive stamper (hereafter, simply referred to as a "substrate), as long as it transmits light having a wavelength required for curing an intermediate layer, and poses no problem in curing the intermediate layer. Preferred examples are comprised of a polycarbonate resin, a polyolefin resin, and an acrylate resin. In a base substrate 110 utilized in the present invention, as illustrated in FIG. 1A, depression and protrusions 111, which are tracking grooves, are formed on a side (hereafter, referred to as a "top face" of the substrate), on which a recording layer 210 is formed, and depressions and protrusions 112 are formed on a side opposite to the top face (hereafter, referred to as a "bottom face" of the substrate). The depressions and protrusions 112 have been utilized as a stamper during fabrication of an optical recording medium previous to the optical recording medium that is being currently produced. The depressions and protrusions 112 may have a contour obtained by inverting the depressions and protrusions 111, or a contour obtained by inverting the depression-protrusion pattern of the tracking grooves for another information disk. The substrate may have any arbitrary thickness, as long as the rigidity thereof can be ensured. In general, the thickness is made to be 0.5 to 1.2 mm. The substrate can be molded in accordance with a known method, e.g., by use of a typical resin molding machine, such as an injection molding machine.

The first recording layer 210 is formed on the base substrate 110 (in FIG. 1A). In the case when the first recording layer 210 is a phase-change type, a typical sputtering apparatus can form the first recording layer 210. The material for the first recording layer 210 is comprised of an alloy comprised of at least one of Te, In, Ga, Sb, Se, Pg, Ag, Au, As, Co, Ni, Mo, W, Pd, Ti, Bi, Zn, Si, and the like, which are commonly known as phase-change recording materials.

Figure 1B:
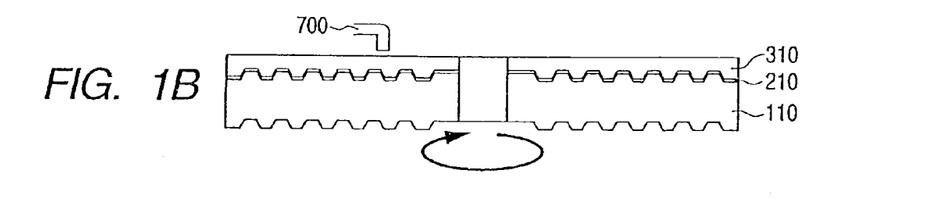

While the substrate 110 is rotating, an ultraviolet curing resin is dispensed, or spin coated, through a nozzle 700, onto the first recording layer 210 to form a layer 310, which becomes an intermediate layer (in FIG. 1B). The thickness of the layer 310 may preferably be 5 to 40 μm.

Figure 1C:
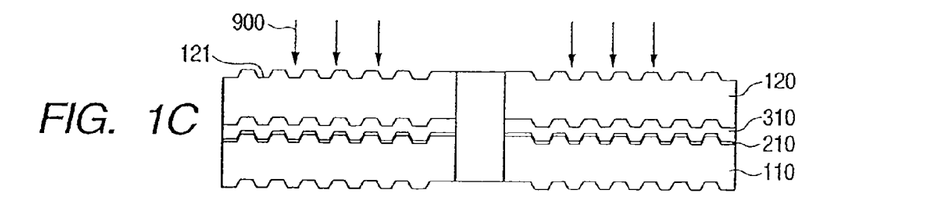
Figure 1D:
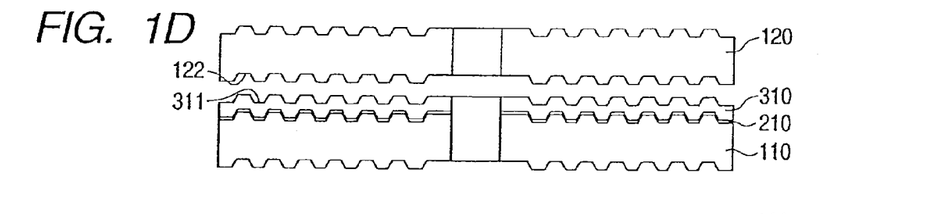

A bottom face 122 of a transmissive stamping-capable substrate (hereafter, simply referred to as a "stamper") 120 that has a top face 121 and the bottom face 122, which are similar to those of the substrate 110, is closely contacted to the surface of the layer 310, thereby transferring the tracking grooves for a second recording layer 220 to the surface of the layer 310, and then, ultraviolet rays (described as "UV" from time to time) 900 are radiated onto the layer 310, so as to cure the layer 310, thereby, forming an intermediate layer 310 (in FIGS. 1C and 1D). The stamper 120 may have the same contour as that of the substrate 110 (in FIG. 1C), or may have, on the top face 121 and the bottom face 122, depression-protrusion patterns utilized for another information disk. It is preferable that, in order to prevent air bubbles from penetrating into the gap between the stamper 12 and the intermediate layer 310, the stamper 120 and the intermediate layer 310 are contacted to each other in a vacuum. After the intermediate layer 310 is cured by use of ultraviolet rays, the stamper 120 is removed, so that information guide tracks 311 for the second recording layer 220 are formed on the top face of the intermediate layer 310 (in FIG. 1D). In addition, it is assumed herein that the top face of each layer signifies the side that is situated farther away from the substrate when being incorporated into an optical disk, and, accordingly, the bottom face of each layer signifies the side that is situated closer to the substrate.

Figure 1E:
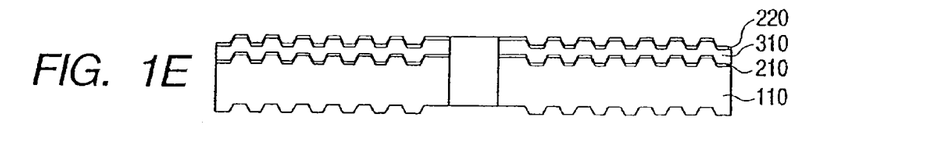

Next, as is the case with the first recording layer 210, the second recording layer 220 is formed on the intermediate layer 310 (in FIG. 1E).

A protection layer 400 is formed on the second recording layer 220 (in FIG. 1F), so that an optical recording medium is completed. The thickness of the protection layer 400 may preferably be 50 to 200 μm. The protection layer 400 may be formed either by means of spin coating or by adhering a sheet-like member.

The stamper 120 removed, as illustrated in FIG. 1D, is utilized as it is, as the base substrate 110, in the formation process (in FIG. 1A), for the first recording layer 210, in the production of the next optical recording medium. Because, in the tracking groove formation process (in FIG. 1C), for the second recording layer 220, in the production of the previous optical recording medium, ultraviolet rays have been radiated onto the substrate 110, the light transmittance of the current substrate 110 is lower than that in the case when the ultraviolet rays have not been radiated. However, in recording or reproducing on the optical recording medium, information recording and reproducing laser beams are not radiated onto the optical recording medium from the base substrate 110 side. Therefore, in essence, no problem is posed.

Figure 2:
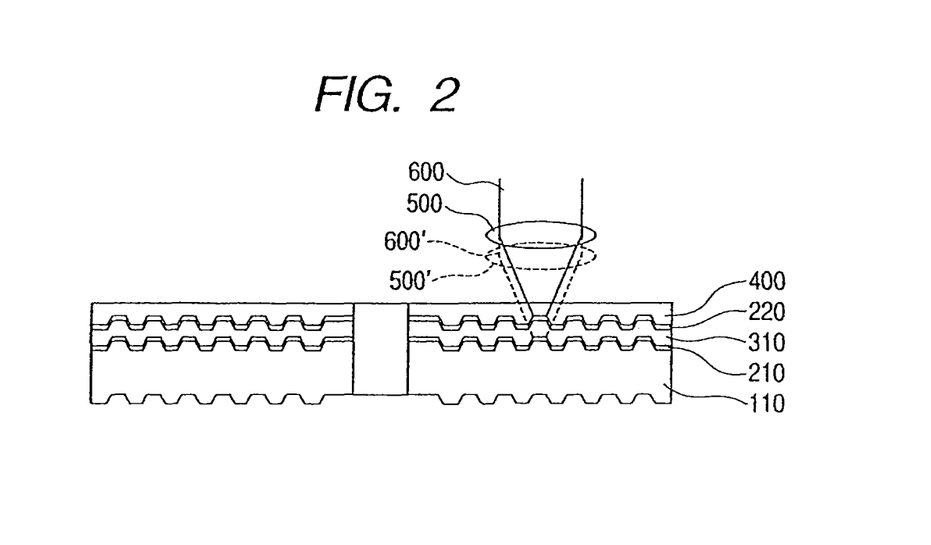
FIG. 2 illustrates the configuration of an optical recording medium produced in accordance with the first embodiment of an optical recording medium manufacturing method according to the present invention.

FIG. 2 is a view schematically illustrating the configuration of an optical recording medium produced in accordance with a manufacturing method according to the first embodiment of the present invention, and a method of recording or reproducing information with the optical recording medium. Laser beams 600 and 600' emitted from a laser-beam source (not shown) are focused on respective recording layers through objective lenses 500 or 500', respectively. The solid lines 600 and 500 represent the condition in which a laser beam is focused on the second recording layer 220. The dotted lines 600' and 500' represent the condition in which a laser beam is focused on the first recording layer 210. Two recording layers 220 and 210 are separated from each other by the intermediate layer 310, and therefore, recording and reproduction of information from one recording layer are not affected by the other recording layer.

As described above, in the manufacturing method according to the first embodiment, by utilizing, instead of a conventional transmissive stamper, a transmissive stamping-capable substrate, the substrate can be recycled, whereby cost reduction can be realized. This can be achieved without adding an additional process to a conventional method.

The first embodiment has been exemplified by a rewritable type optical recording medium. However, it goes without saying that even a write-once type optical recording medium having an organic-system recording layer can demonstrate a similar effect. In addition, it goes without saying that the manufacturing method according to the present invention can be applied to a reproduction-only-type optical recording medium that has, instead of an information guide track, a reflection layer provided on an information-pit string.

Second Embodiment

The difference between an optical recording medium according to the second embodiment and an optical recording medium, produced in accordance with the manufacturing method according to the first embodiment, is the number of recording layers and the configuration of a substrate.

In the first place, taking into account the thickness of a stamper to be attached in a process, described later, the base substrate 110 is prepared, which is thinner than the substrate of an optical recording medium (hereafter, referred to as a "completion substrate") to be completed, and then, the first recording layer 210, the first intermediate layer 310, and the second recording layer 220 are formed, in accordance with the same processes as those illustrated in FIGS. 1A, 1B, 1C, 1D and 1E. The stamper 120, on which the tracking grooves 311 for the second recording layer are formed, is utilized as the base substrate for the next optical recording medium.

Next, a second intermediate layer 320, a third recording layer 230, a third intermediate layer 330, and a fourth recording layer 240 are formed in accordance with the same processes as those illustrated in FIGS. 1B, 1C, 1D and 1E. Stampers 130 and 140 are required for forming tracking grooves 331 for the third recording layer 230 and tracking grooves 331 for the fourth recording layer 240, respectively.

Figure 1F:
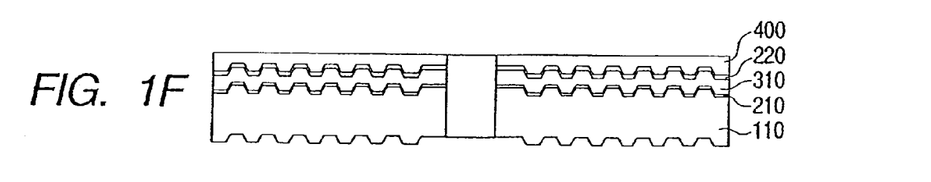

After the fourth recording layer 240 is formed, a protection layer 400 is formed in accordance with the same process as that illustrated in FIG. 1F.

Figure 3:
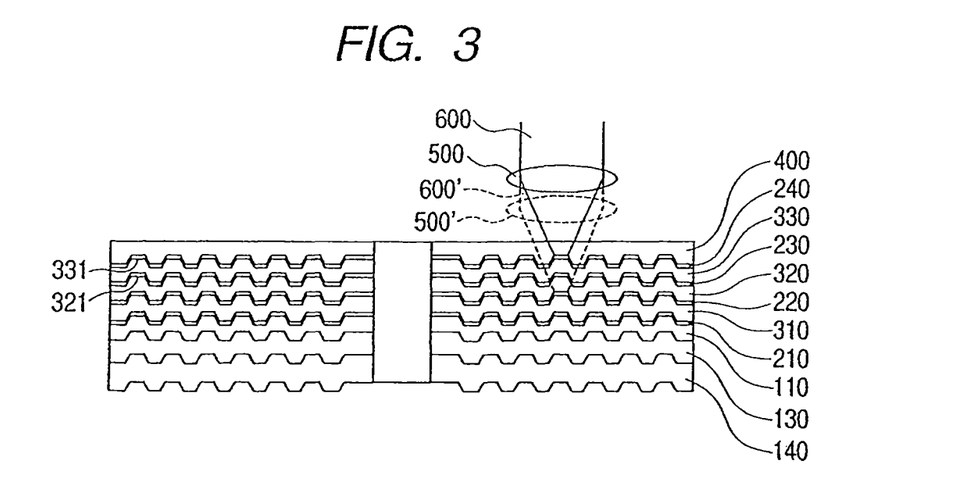
FIG. 3 illustrates the configuration of an optical recording medium produced in accordance with a second embodiment of an optical recording medium manufacturing method according to the present invention.

The stampers 130 and 140 utilized for forming the tracking grooves 321 and 331, respectively, are adhered to the bottom face of the substrate 110, e.g., in the order as illustrated in FIG. 3, so that an optical recording medium, according to the second embodiment, is completed.

Accordingly, in the second embodiment, in which three transmissive stamping capable substrate 110, 130, and 140 are attached on top of the other, it is preferable to make the respective thicknesses of the stamping-capable substrates 110, 130, and 140 approximately one third of the thickness of the completion substrate. It goes without saying that, without utilizing, as the base substrate of another optical recording medium, any one of the stampers that have been utilized for forming the tracking grooves of the optical recording medium, all the stampers may be attached on top of one another. In other words, the thickness of each transmissive stamping-capable substrate may occupy a part, of the thickness of a completion substrate including that transmissive stamping-capable substrate, that corresponds to the share of that stamper.

In addition, the depressions and protrusions for forming the tracking grooves are not required for attaching the transmissive stamping-capable substrates on top of one another. In other words, the depressions and protrusions are not required for the side, of each stamper according to the second embodiment, which is not utilized for the formation of the tracking grooves. Therefore, a stamper, only on one side of which depressions and protrusions for foaming the tracking grooves are formed, can also be applied to the manufacturing method according to the present invention.

Third Embodiment

Figure 4:
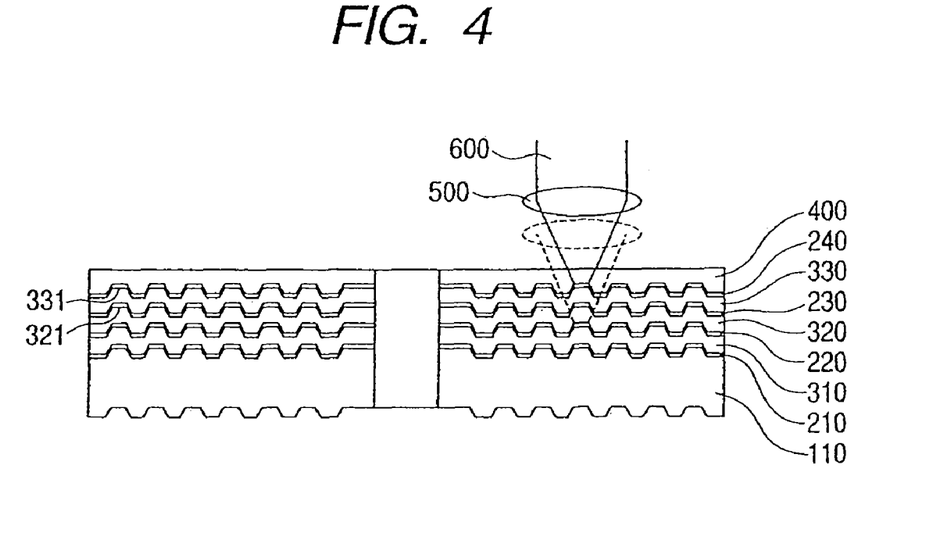
FIG. 4 illustrates the configuration of an optical recording medium produced in accordance with a third embodiment of an optical recording medium manufacturing method according to the present invention.

An optical recording medium according to the third embodiment is comprised of four recording layers 210, 220, 230, and 240 and a transmissive stamping-capable substrate 110 that is not attached.

The ultraviolet-ray transmittance of the transmissive stamping-capable substrate 110 is lowered each time the transmissive stamping-capable substrate is utilized as a stamper. However, by prolonging the ultraviolet-ray radiation time by approximately 10%, desired curing can be performed.

In a manufacturing method according to the third embodiment, in the first place, the base substrate 110 is prepared, and then, the first recording layer 210, the first intermediate layer 310, and the second recording layer 220 are formed, as is the case with the first embodiment (in FIG. 1E). FIG. 4 illustrates an optical recording medium in the case wherein no stamper is attached to the base substrate 110. Thus, the base substrate 110, having the same thickness as that of a completion substrate, is prepared.

Next, the stampers 130 and 140, which have been utilized for manufacturing a previous optical recording medium and have respective depression-and-protrusion surfaces corresponding to the tracking grooves for the third and fourth recording layers of the current optical recording medium, are prepared. By use of the stampers 130 and 140, the second intermediate layer 320, the third recording layer 230, the third intermediate layer 300, and the fourth recording layer 240 are formed, in accordance with the same processes as those illustrated in FIGS. 1B, 1C, 1D and 1E. The tracking grooves 321 for the third recording layer 230 and the tracking grooves 331 for the fourth recording layer 240 are formed. The used stampers 130 and 140 being used are recycled as stampers utilized in producing another optical recording medium, and then, utilized as base substrates.

As described above, by recycling a transmissive stamping-capable substrate that has been utilized for a process in which tracking grooves are formed in an intermediate layer, as a stamper and a substrate, production costs for an optical recording medium and waste disposal can be reduced.

Fourth Embodiment

The difference between an optical recording medium produced in accordance with a manufacturing method according to the first embodiment and an optical recording medium produced in accordance with a manufacturing method according to the fourth embodiment, is the formation order of layers that configure the respective optical recording media. In the first embodiment, the first recording layer, the intermediate layer, the second recording layer, and the protection layer are formed and laminated in that order. In contrast, in the fourth embodiment, first, a protection layer is formed. Second, a first recording layer and a second recording layer are separately formed and laminated. Third, an intermediate layer is formed, and then, all the layers are laminated. The fourth embodiment will be explained below, while taking as an example a case in which an optical recording medium having the same layer configuration and depression-protrusion pattern as those of an optical recording medium according to the first embodiment is produced.

Figure 5A:
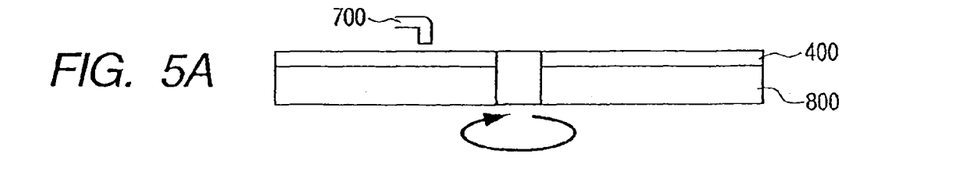
FIGS. 5A, 5B, 5C, 5D, 5E, 5F and 5G illustrate a production process of a fourth embodiment of an optical recording medium manufacturing method according to the present invention.

A supporting base 800, which holds and handles a thin protection layer, may be an arbitrary material, e.g., metal and glass, as long as the material has a certain degree of robustness. One face of the supporting base 800 is mirror polished in advance.

While the supporting base 800 is rotating, an ultraviolet curing resin, which is a material for the protection layer 400, is dispensed through a nozzle 700 on the polished surface, and then, it is quickly spun to obtain a uniform film thickness, so that the film 400, which becomes the protection layer, is formed (in FIG. 5A).

Figure 5B:
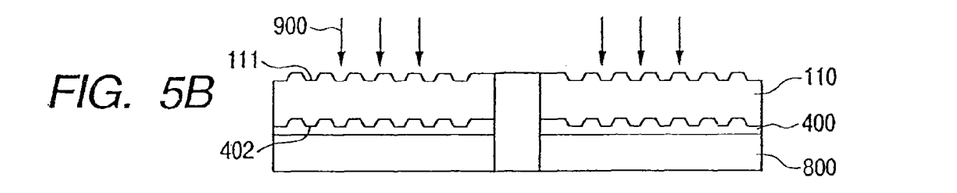

While the bottom face 112 of the transmissive stamping-capable substrate 110 is closely contacted to the formed film 400, the ultraviolet rays 900 are radiated (in FIG. 5B). The contacted surface of the film 400 becomes a bottom face 402 of the protection layer 400. By removing the transmissive stamping-capable substrate 110, a depression-protrusion pattern of tracking grooves for a second recording layer is formed on the surface of the film 400. The pattern and the tracking grooves for the second recording layer on the intermediate layer 310 flank the second recording layer and are complementary to each other. Therefore, the bottom face pattern 112 of the transmissive stamper 110 according to the fourth embodiment, in which the pattern is formed through stamping and the bottom face pattern 112, according to the first embodiment, in which the pattern of the tracking grooves for the second recording layer, is directly stamped on the intermediate layer 310, should be opposite to each other in terms of the depressions and protrusions. The second recording layer 220 is formed on the pattern 402 that has been formed, in this way, in the bottom face of the film 400 (in FIG. 5C).

Figure 5C:
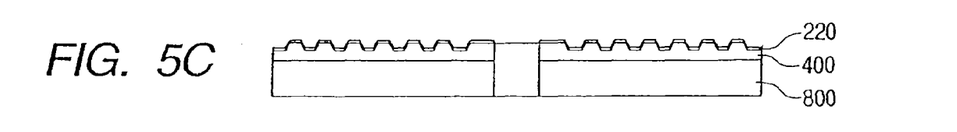

In the process described above, the protection layer 400, having the second recording layer 220, is formed on the surface of the supporting base.

Figure 5D:
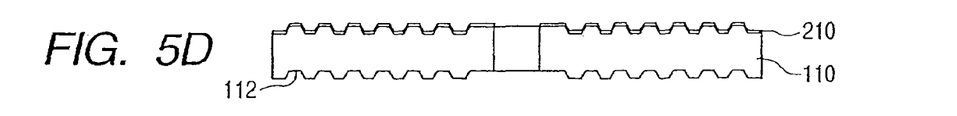
Figure 5E:
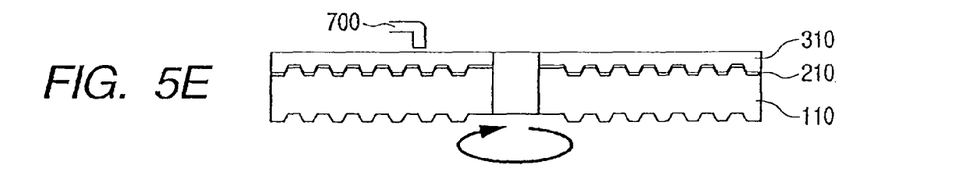

A pattern of tracking grooves for the first recording layer has been formed on the top face 111 of the transmissive stamping-capable substrate 110 that is removed after the irradiating process in FIG. 5B. Thus, the first recording layer 210 is formed on the top face 111 (in FIG. 5D). The ultraviolet curing resin 310 is dispensed, or spin coated, through the nozzle 700 on the first recording layer 210, to form the intermediate layer 310 (in FIG. 5E).

Figure 5F:
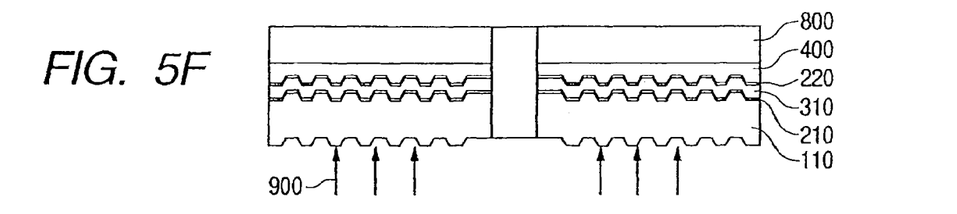

After the formed intermediate layer 310 is attached to the supporting base illustrated in FIG. 5C, at the side, of the supporting base, on which the second recording layer is formed, the resin configuring the intermediate layer 310 is cured through radiation of the ultraviolet rays 900 from the transmissive stamping-capable substrate 110 side (in FIG. 5F).

Figure 5G:
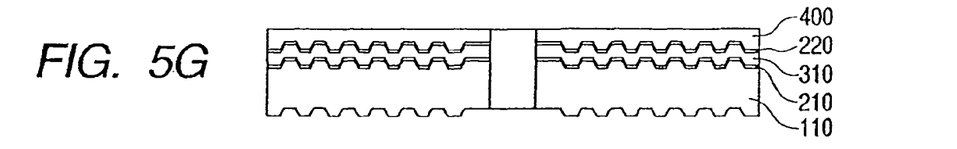

In the last place, the supporting base 800 is removed away, so that a two-layer optical recording medium is completed (in FIG. 5G).

Although being different from the first embodiment in the process order, the fourth embodiment also utilizes a transmissive stamping-capable substrate, whereby, an optical recording medium, which wastes no material and is inexpensive, can be provided.

While the present invention has been described with reference to exemplary embodiments, it is to be understood that the invention is not limited to the disclosed exemplary embodiments. The scope of the following claims is to be accorded the broadest interpretation, so as to encompass all such modifications and equivalent structures and functions.

What is claimed is:

1. A method of manufacturing a multilayered optical recording medium, said method comprising the steps of:
   providing a protection layer on a supporting base;
   providing a transmissive stamper having at least one depression-protrusion outer contour;
   contacting the depression-protrusion outer contour of the transmissive stamper with the protection layer on the supporting base and transferring the depression-protrusion outer contour of the transmissive stamper to the protection layer on the supporting base;
   irradiating the transmissive stamper with ultraviolet rays, the irradiating of the transmissive stamper curing the protection layer to produce a cured protection layer;
   removing the transmissive stamper from the protection layer;
   depositing a recording layer on the cured protection layer;
   depositing a recording layer on the transmissive stamper;
   forming an intermediate layer on the recording layer that has been deposited on the transmissive stamper;
   attaching the intermediate layer to the recording layer on the cured protection layer;
   irradiating the transmissive stamper with ultraviolet rays, the irradiating of the transmissive stamper curing the intermediate layer to produce a cured intermediate layer; and
   removing the supporting base from the cured protection layer to form a multilayered optical recording medium.

2. The method of manufacturing a multilayered optical recording medium according to claim 1, further comprising a step of selecting a transmissive stamper from the group consisting of a polycarbonate resin, a polyolefin resin and an acrylate resin.

3. The method of manufacturing a multilayered optical recording medium according to claim 1, wherein the step of contacting and transferring the depression-protrusion outer contour of the transmissive stamper with the protection layer on the supporting base further comprises forming tracking grooves on the protection layer.

4. The method of manufacturing a multilayered optical recording medium according to claim 1, wherein the step of contacting and transferring the depression-protrusion outer contour of the transmissive stamper with the protection layer on the supporting base further comprises stamping the depression-protrusion outer contour of the transmissive stamper onto the protection layer.

5. The method of manufacturing a multilayered optical recording medium according to claim 1, wherein the step of forming an intermediate layer on the recording layer that has been deposited on the transmissive stamper further comprises a step of dispensing or spin coating a resin material on the recording layer.

6. The method of manufacturing a multilayered optical recording medium according to claim 1, wherein the step of depositing a recording layer on the cured protection layer further comprises a step of dispensing or spin coating a resin material on the cured protection layer.

7. The method of manufacturing a multilayered optical recording medium according to claim 1, wherein the step of depositing a recording layer on the transmissive stamper further comprises a step of dispensing or spin coating a resin material on the transmissive stamper.

8. The method of manufacturing a multilayered optical recording medium according to claim 1, wherein the step of providing a transmissive stamper further comprises providing a transmissive stamper having a first side and a second side, the second side being opposite to the first side, wherein each of the first and second sides has at least one depression-protrusion outer contour.

9. The method of manufacturing a multilayered optical recording medium according to claim 8, wherein the step of contacting and transferring the depression-protrusion outer contour of the transmissive stamper with the protection layer on the supporting base further comprises transferring the depression-protrusion outer contour from the first side of the transmissive stamper to the protection layer on the supporting base.

10. The method of manufacturing a multilayered optical recording medium according to claim 9, wherein the step of depositing a recording layer on the transmissive stamper further comprises depositing the recording layer onto the second side of the transmissive stamper.

* * * * *